United States Patent
Kilgore et al.

(10) Patent No.: US 9,049,929 B2
(45) Date of Patent: Jun. 9, 2015

(54) APPLIANCE APPARATUS INCLUDING A BONDED BRACKET

(71) Applicants: Dorian J. Kilgore, Commerce Township, MI (US); William Teller, Lake Orion, MI (US); Jeffrey Moser, White Lake, MI (US)

(72) Inventors: Dorian J. Kilgore, Commerce Township, MI (US); William Teller, Lake Orion, MI (US); Jeffrey Moser, White Lake, MI (US)

(73) Assignee: A. RAYMOND ET CIE, Grenoble (FR)

( * ) Notice: Subject to any disclaimer, the term of this patent is extended or adjusted under 35 U.S.C. 154(b) by 79 days.

(21) Appl. No.: 13/754,962

(22) Filed: Jan. 31, 2013

(65) Prior Publication Data

US 2014/0210324 A1     Jul. 31, 2014

(51) Int. Cl.
| | |
|---|---|
| A47B 77/06 | (2006.01) |
| A47B 77/08 | (2006.01) |
| A47B 96/00 | (2006.01) |
| B29C 45/00 | (2006.01) |
| D06F 39/14 | (2006.01) |
| D06F 49/00 | (2006.01) |
| D06F 37/10 | (2006.01) |
| D06F 37/18 | (2006.01) |
| D06F 37/28 | (2006.01) |

(52) U.S. Cl.
CPC .................. *A47B 77/08* (2013.01); *A47B 96/00* (2013.01); *B29C 45/0053* (2013.01); *D06F 39/14* (2013.01); *D06F 49/003* (2013.01); *D06F 37/10* (2013.01); *D06F 37/18* (2013.01); *D06F 37/28* (2013.01)

(58) Field of Classification Search
CPC .... A47B 77/08; A47B 96/00; B29C 45/0053; A47L 15/4257; D06F 39/14; D06F 37/18; D06F 37/10; D06F 37/28; D06F 49/003
USPC ......................................................... 312/228
See application file for complete search history.

(56) References Cited

U.S. PATENT DOCUMENTS

| | | | |
|---|---|---|---|
| 3,791,074 A | 2/1974 | Waffenschmidt | |
| 3,916,055 A | 10/1975 | Wagner | |
| 3,952,369 A * | 4/1976 | Erickson | .......................... 16/265 |
| 4,167,259 A | 9/1979 | Bury | |
| 4,250,596 A | 2/1981 | Hara et al. | |
| 4,493,577 A | 1/1985 | Cosenza | |
| 4,563,380 A | 1/1986 | Black et al. | |
| 5,013,391 A | 5/1991 | Hutter, III et al. | |
| 5,057,354 A | 10/1991 | Kunert et al. | |
| 5,331,784 A | 7/1994 | Agrawal et al. | |
| 5,475,956 A | 12/1995 | Agrawal et al. | |
| 5,544,458 A | 8/1996 | Fisher et al. | |
| 5,551,197 A | 9/1996 | Repp et al. | |

(Continued)

FOREIGN PATENT DOCUMENTS

| | | |
|---|---|---|
| DE | 4014200 A1 | 11/1990 |
| DE | 4427951 C1 | 3/1996 |

(Continued)

*Primary Examiner* — Daniel J Troy
*Assistant Examiner* — Timothy M Ayres
(74) *Attorney, Agent, or Firm* — Harness, Dickey & Pierce, P.L.C.

(57) ABSTRACT

An appliance apparatus includes an adhesively bonded bracket or support. In another aspect, a clothing apparatus includes a moveable transparent panel, such as a glass door or lid, which has a polymeric support or bracket adhesively bonded thereto. A further aspect provides polyurethane adhesive pellets bonding a polymeric hinge bracket to only a backside of a glass appliance panel.

22 Claims, 4 Drawing Sheets

(56) References Cited

U.S. PATENT DOCUMENTS

| | | |
|---|---|---|
| 5,593,120 A | 1/1997 | Hamerski |
| 5,755,908 A | 5/1998 | Rayburn et al. |
| 5,756,185 A | 5/1998 | Lesser |
| 5,966,874 A | 10/1999 | Repp et al. |
| 6,068,719 A | 5/2000 | Lewno |
| 6,128,860 A | 10/2000 | Repp et al. |
| 6,298,606 B1 | 10/2001 | Repp et al. |
| 6,319,344 B1 | 11/2001 | Lewno |
| 6,703,129 B1 | 3/2004 | Kakehi et al. |
| 6,766,596 B1* | 7/2004 | Bienick et al. ................ 34/601 |
| 6,803,111 B2 | 10/2004 | Capriotti et al. |
| 6,846,039 B2 | 1/2005 | Lewno |
| 6,862,851 B2 | 3/2005 | Burnside et al. |
| 6,871,450 B2 | 3/2005 | Repp et al. |
| 7,024,822 B2 | 4/2006 | Scheer et al. |
| 7,332,225 B2 | 2/2008 | Lewno |
| 7,360,338 B2 | 4/2008 | Repp et al. |
| 7,563,506 B2 | 7/2009 | Bremont et al. |
| 7,838,115 B2 | 11/2010 | Lewno |
| 8,065,835 B2 | 11/2011 | Hansel et al. |
| 8,235,452 B2 | 8/2012 | Repp et al. |
| 8,262,177 B2 | 9/2012 | Picken et al. |
| 8,276,409 B2 | 10/2012 | Tooker |
| 8,297,085 B2 | 10/2012 | Kim et al. |
| 8,322,073 B2 | 12/2012 | Lewno |
| 8,459,754 B2* | 6/2013 | Cho et al. ....................... 312/228 |
| 8,523,300 B2* | 9/2013 | Najera Bernal et al. ...... 312/228 |
| 2005/0129958 A1 | 6/2005 | Hansel |
| 2006/0090523 A1* | 5/2006 | Lyu ................................. 68/3 R |
| 2010/0107497 A1 | 5/2010 | Hulst et al. |
| 2011/0117370 A1 | 5/2011 | Ash et al. |
| 2011/0176863 A1 | 7/2011 | Hanley et al. |
| 2011/0239403 A1 | 10/2011 | Walhorn et al. |
| 2011/0288242 A1 | 11/2011 | Bremont et al. |
| 2011/0296630 A1* | 12/2011 | Frazer et al. ....................... 8/159 |
| 2012/0083578 A1* | 4/2012 | Bremont et al. ............. 525/418 |

FOREIGN PATENT DOCUMENTS

| | | | |
|---|---|---|---|
| DE | 10143542 | A1 | 3/2003 |
| DE | 10339586 | B3 | 8/2004 |
| EP | 0415692 | A2 | 3/1991 |
| EP | 0870861 | A1 | 10/1998 |
| EP | 1120520 | A2 | 8/2001 |
| EP | 1329580 | A2 | 7/2003 |
| EP | 2551400 | A1 | 1/2013 |
| FR | 2868115 | A1 | 9/2005 |
| GB | 2294698 | A | 5/1996 |
| JP | H08244539 | A | 9/1996 |
| JP | 2010014147 | A | 1/2010 |
| WO | WO-2011004171 | A1 | 1/2011 |

* cited by examiner

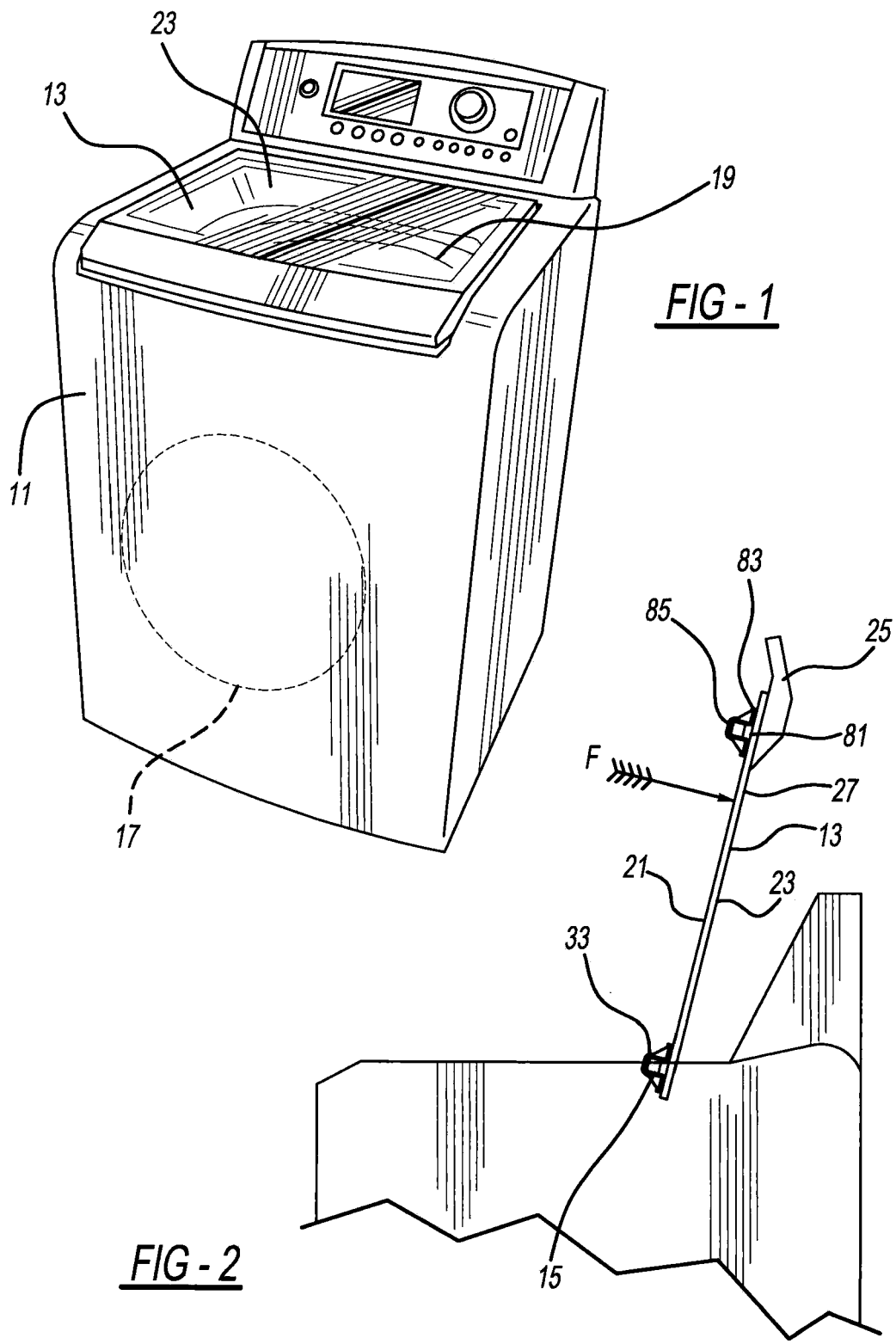

APPLIANCE APPARATUS INCLUDING A BONDED BRACKET

BACKGROUND AND SUMMARY

The present invention relates generally to an appliance apparatus and more particularly to a clothing appliance apparatus including a bonded polymeric bracket or support.

It is known to have an appliance, such as a washing machine or dryer, which has a glass door or lid. Such doors typically include polymeric frames or bezels that are mechanically connected by way of screws in order to sandwich external and backside surfaces of the glass lid adjacent its periphery. Often such frames include handles, striker latches and metallic hinge brackets which are separately screwed on to the polymeric frame. One such example can be found within U.S. Pat. No. 8,297,085 entitled "Washing Machine" which issued to Kim et al. on Oct. 30, 2012, and is incorporated by reference herein.

It is also known to adhesively bond a stamped metal bracket onto a glass appliance lid. The stringent bleach vapor and corrosion resistance requirements for appliances, however, require expensive and relatively heavy e-coating of the metal brackets. This device is shown in U.S. Pat. No. 8,276,409 entitled "Glass Appliance Cover with Bonded Hardware" which issued to Tooker on Oct. 2, 2012, which is incorporated by reference herein.

In accordance with the present invention, an appliance apparatus includes an adhesively bonded bracket or support. In another aspect, a clothing apparatus includes a moveable transparent panel, such as a glass door or lid, which has a polymeric support or bracket adhesively bonded thereto. A further aspect provides polyurethane adhesive pellets bonding a polymeric hinge bracket to only a backside of a glass appliance panel. A method of manufacturing an appliance apparatus is also disclosed.

The appliance apparatus of the present invention is advantageous over traditional constructions. For example, the polymeric support or bracket of the present apparatus is bleach and corrosion resistant without requiring expensive and heavy coatings. Furthermore, the present apparatus is advantageously injection molded from an engineering grade polymer to have a stiff and rigid shape with offset angled walls and spaced apart ribs extending therebetween, with optional holes extending therethrough created in the same process as the flange and wall. Moreover, the heat activated adhesive pellets used to bond the present bracket to the transparent panel do not exhibit the typical messy application and end of cycle purging otherwise required with pumped bead adhesives and the like. Additional advantages and features of the present invention will become apparent from the following description and appended claims, taken in conjunction with the accompanying drawings.

BRIEF DESCRIPTION OF THE DRAWINGS

FIG. 1 is a perspective view showing an appliance of the present invention;

FIG. 2 is a diagrammatic side view showing the present appliance with its door in an open position;

DETAILED DESCRIPTION

Figure 3:
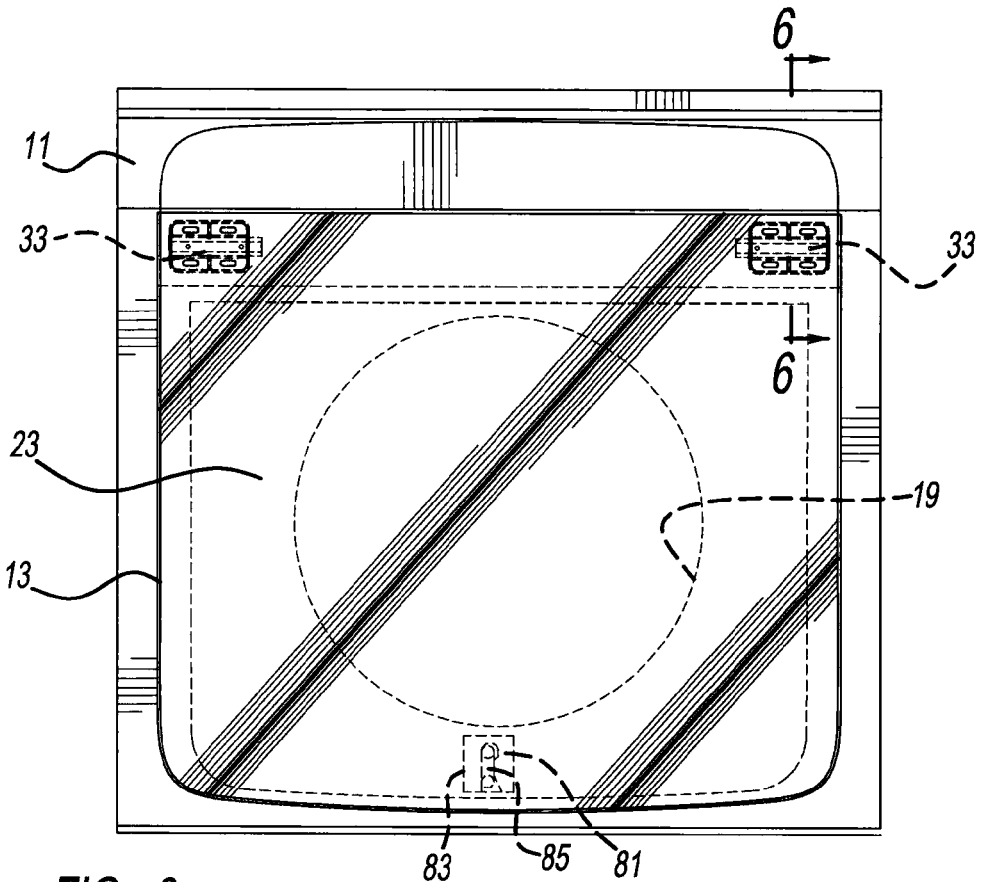
FIG. 3 is a top elevational view showing the present appliance with the door in a closed position.

An appliance 11 is preferably a clothing washing machine or a clothing dryer. Such a washing machine appliance 11 is illustrated in FIGS. 1 and 2. Washing machine appliance 11 is either a top loading model with a lid or door 13 which is moveable from a generally horizontal closed position (as shown in FIG. 1) to a generally vertical or beyond vertical open position (as shown in FIG. 2). For the top loading model, door 13 is pivotable about a generally horizontal hinge axis defined by a pair of aligned metal hinges 15. For the front loading model, a lid or door 17 is moveable from a closed position to an open position about a generally vertical hinge axis. For either version, door 13 or 17 allows access to a rotating clothing basket 19 behind a backside surface of the door.

Door 13 includes a predominantly transparent glass panel 23 and may optionally include a black or opaque frit band adjacent a periphery thereof on a backside surface 21, to hide the various components attached thereto when door 13 is closed. Additionally, a handle 25 is fastened to an exterior surface 27 of glass panel 23.

Figure 4:
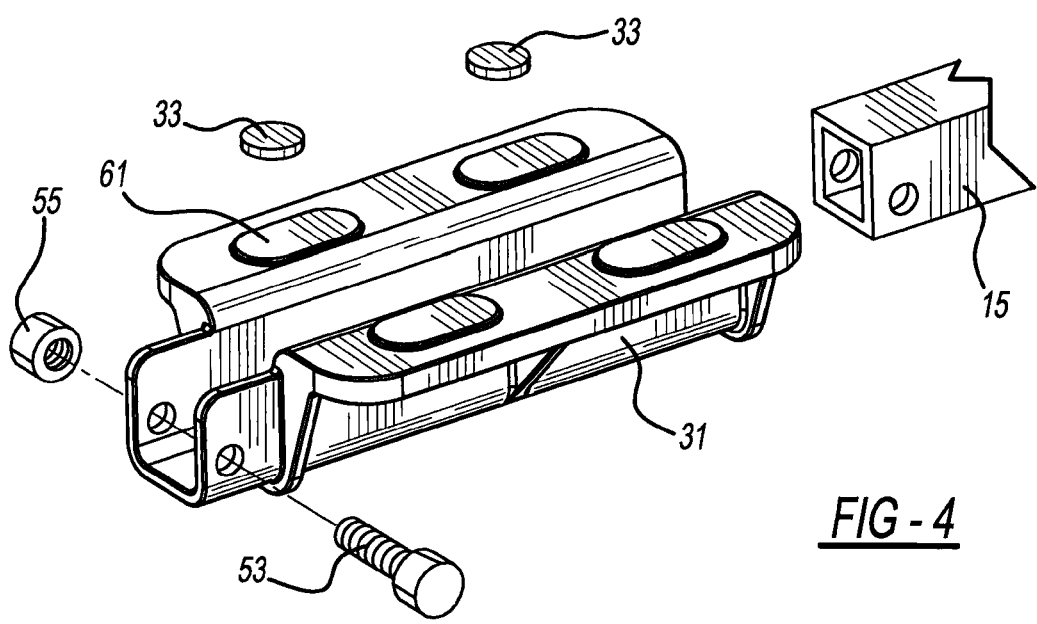
FIG. 4 is an exploded, top perspective view showing a hinge bracket of the present appliance.
Figure 5:
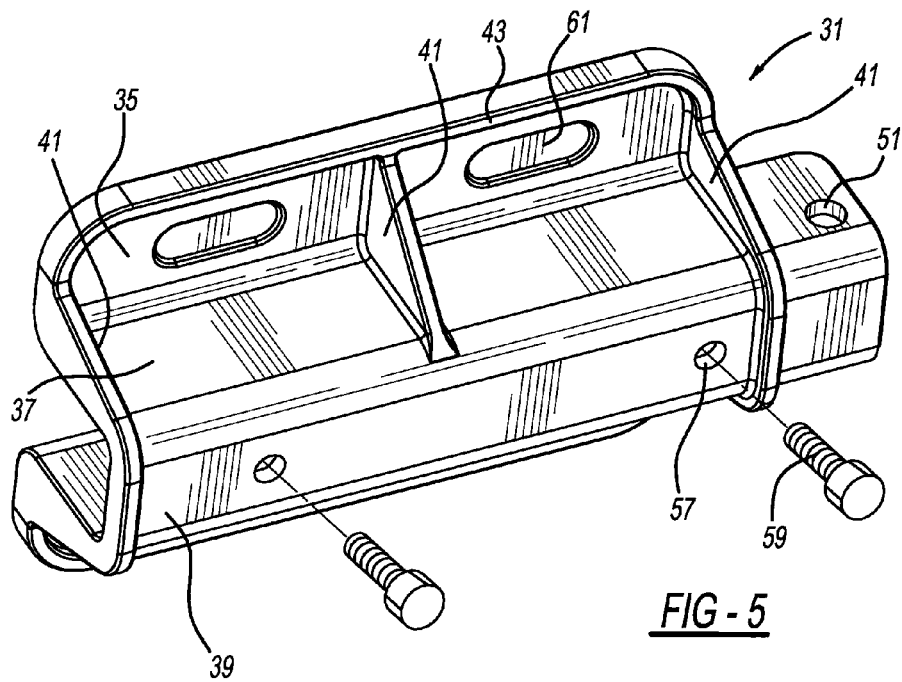
FIG. 5 is an exploded, bottom perspective view showing the hinge bracket of the present appliance.
Figure 6:
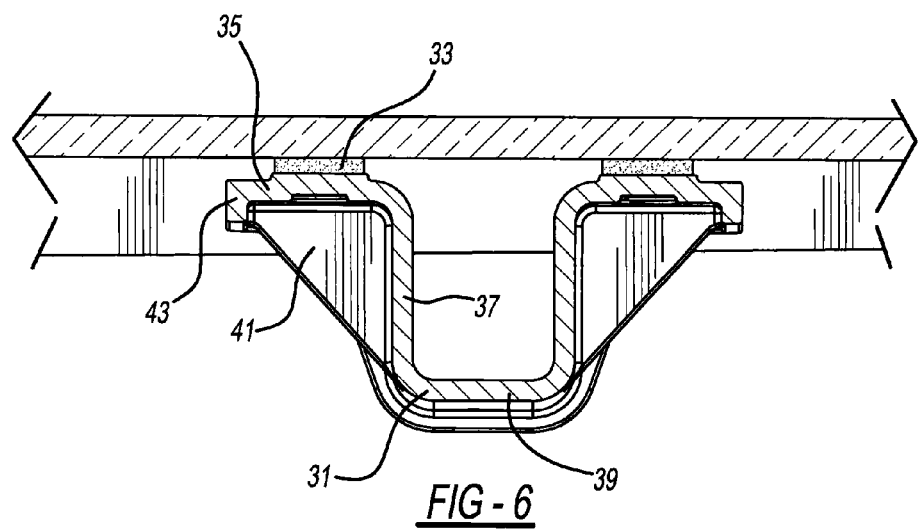
FIG. 6 is a cross-sectional view, taken along line 6-6 of FIG. 3, showing the hinge bracket attached to the door of the present appliance.

Referring to FIGS. 4-6, a polymeric hinge bracket or support 31 is bonded to only backside surface 21 of glass panel 23, or the frit attached thereto, through pre-formed and discrete polyurethane pellets 33. Hinge bracket 31 includes a pair of outwardly extending flanges or wings 35, angularly offset and almost perpendicular main walls 37, a spanning bottom wall 39 and at least three tapered ribs 41 spanning between at least flange 35 and the adjacent main wall 37. Walls 37 and 39 define a generally U-shaped cross-sectional configuration. The outermost ribs additionally extend across and project from bottom wall 39, and transition into an overhanging peripheral reinforcement structure 43. Ribs 41 and structure 43 stiffen hinge bracket 31 to deter torsional flexure. At least one hole 51 is disposed in each main wall 37 for receiving a threaded bolt fastener 53, upon which a nut 55 is engaged for securing to hinge 15 which is inserted within the trough-like space defined by an inside surface of main walls 37 and bottom wall 39. There are also at least two holes 57 in bottom surface 39 for receiving threaded fasteners 59 which also engage hinge 15. Alternatively, fasteners 53 and 59 may be a rivet, cotter pin, or the like.

Raised pads 61 are formed in upper surfaces of flanges 35 for receiving adhesive pellets 33. Pads 61 are preferably elongated and somewhat oval shape, but may alternately be circular, rectangular or have other shapes depending upon the size of the adhesive pellets, the adhesive glass panel-to-flange gap desired, and the particular application to be employed. Hinge bracket 31 is preferably injection molded from an engineering grade polymer, such as a 30% glass filled nylon or PBT polymeric resin. The walls, flanges, ribs and holes are all integrally molded as a single polymeric part. The use of a polymeric material is highly advantageous since it is resistant to bleach, detergent and water vapor during use in the clothing appliance, without requiring an additional expensive and relatively heavy coating such as e-coating, galvanization or paint as would otherwise be required for a metallic hinge bracket. It is believed that the present polymeric hinge bracket 31 will exceed standard industry laboratory test procedures for bleach vapor resistance and also the required force loading along direction F as shown in FIG. 2.

Adhesive pellets 33 are of a polyurethane composition which is pre-formed into discrete, disc-shaped pellets having a circular side shape bounded by generally flat ends. The present adhesive pellets 33 advantageously do not require messy and cumbersome application by a pump and dispersing gun as a continuous bead. The composition of adhesive pellets 33 is disclosed in U.S. Patent Publication No. 2012/0083578 entitled "System And Method for Manufacturing Heat-Activatable Adhesive Pellets" which published to Bremont et al. on Apr. 5, 2012, and U.S. Patent Publication No. 2011/0288242 entitled "Adhesive Polyurethane Powder Capable of being Activated By Heat" which issued to Bremont et al. on Nov. 24, 2011, both of which are commonly owned with the present application and are incorporated by reference herein. Alternately, the adhesive pellets may have tapered ends, be 2-3 mm diameter spheres, or have other shapes.

Figure 7A:
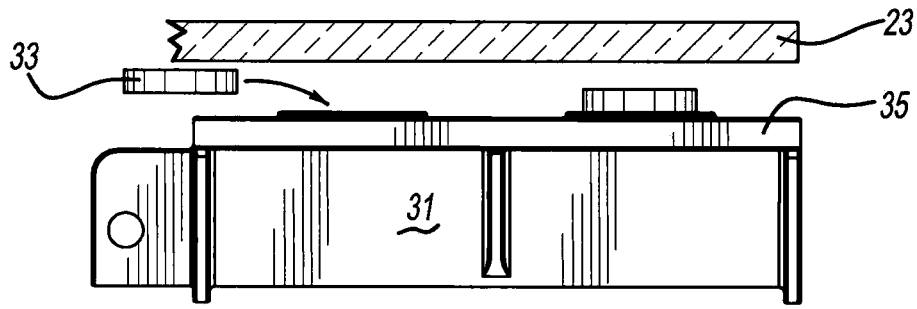
FIGS. 7A-7C are a series of diagrammatic side views showing processing steps for the hinge bracket and door of the present appliance.
Figure 7B:
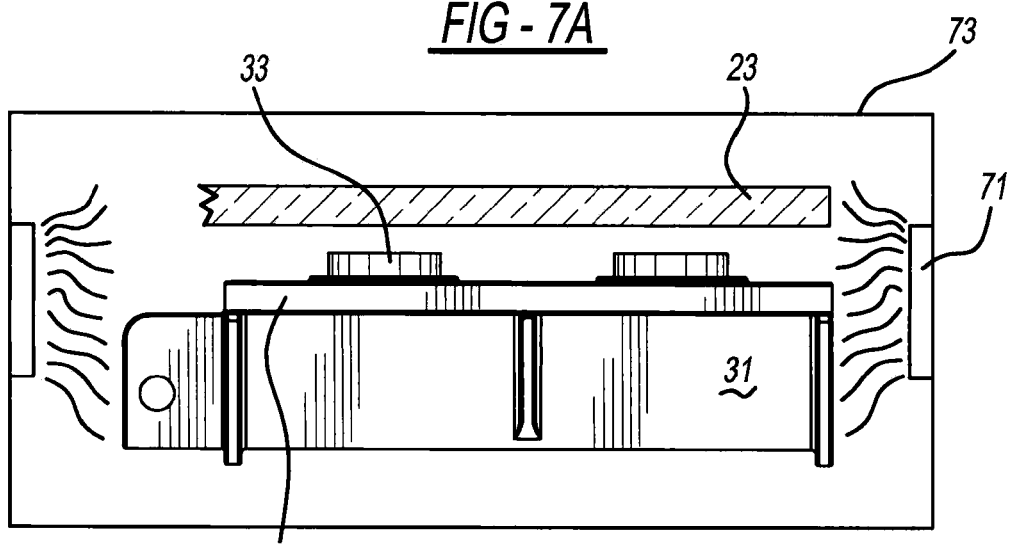
Figure 7C:
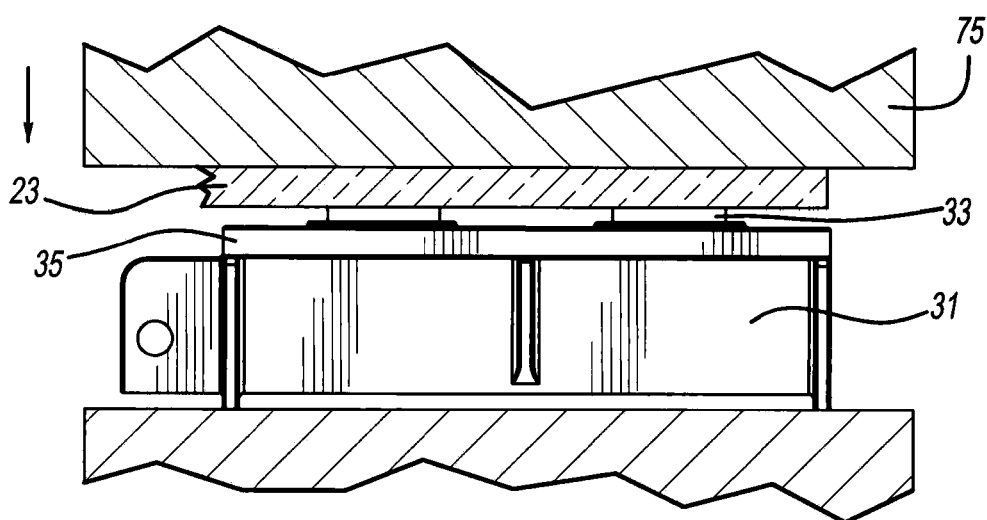

The installation process can be observed in FIGS. 7A-7C. First, adhesive pellets 33 are included as separate and discrete parts, made off-site, prior to installation on the hinge bracket or glass. Secondly, hinge bracket 31 is injection molded in an injection molding machine entirely from polymeric resin. Third, the flat ends of adhesive pellets 33 are manually placed upon and preliminarily stuck to the pads on flanges 35 of each polymeric hinge bracket 31.

Fourth, glass panel 23 is then placed adjacent to the opposite flat ends of adhesive pellets 33 from those ends attached to hinge bracket 31. In practice, glass panel 23 may be above hinge bracket 31, as is illustrated, or hinge bracket 31 may be inverted such that glass panel 23 is below it, depending upon the specific installation fixtures employed and order of installation desired.

Fifth, FIG. 7B next shows heaters 71 heating glass panel 23 and hinge bracket 31 which cause adhesive pellets 33 to surpass their heat activation temperature of at least 100° C., and more preferably between 150-160° C. Hot plate heating is preferred, but alternately, an oven 73, heat lamp, infrared or other heaters may be employed. Subsequently and sixth, at least one die or fixture 75 is moved toward another in order to compress adhesive 33 between glass panel 23 and hinge bracket 31 to create a secure bond therebetween. Finally, after at least initial adhesive curing and crosslinking, the dies or fixtures are opened and the attached parts are removed for later assembly to the hinges and appliance.

While various embodiments of the present appliance apparatus and bonded bracket have been disclosed, it should be appreciated that other variations are possible. For example, the bracket or support may be a polymeric striker 81 including an adhesively bonded flange 83 with a polymeric U-shaped loop 85 extending therefrom for receiving a latch (see FIGS. 2 and 3). It is also envisioned that the hinge itself may have a variety of shapes and components, although certain advantages may not be realized. Additional processing steps can additionally be employed beyond those disclosed. Moreover, a pumpable adhesive bead can be used in place of the discrete adhesive pellets, however, many advantages will not be achieved. Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

The invention claimed is:

1. An appliance apparatus comprising:
a moveable transparent appliance panel;
a polymeric support including a surface facing the moveable transparent appliance panel;
at least one adhesive pellet securing the polymeric support solely to a backside surface of the appliance panel; and
at least one raised pad extending outwardly from the surface of the polymeric support that faces the moveable transparent appliance panel that contacts the at least one adhesive pellet during bonding of the moveable transparent appliance panel to the polymeric support;
wherein the polymeric support has a generally U-shaped cross-sectional configuration with open ends and comprises a pair flanges extending outwardly to defining the surface of the polymeric member that faces the moveable transparent appliance panel, the surface being substantially parallel to the adjacent backside surface of the appliance panel, the polymeric support further comprising main walls offset angled from the pair of flanges and spaced apart tapered ribs spanning between the flange and the main walls, the flange, main walls and ribs all being integrally created.

2. The appliance apparatus of claim 1, wherein the at least one adhesive pellet is formed as multiple adhesive pellets that are stuck to the at least one raised pad of the polymeric support prior to heated bonding of the multiple adhesive pellets to both the polymeric support and appliance panel.

3. The appliance apparatus of claim 1, wherein the at least one adhesive pellet includes a polyurethane composition that is heat activated at a temperature greater than 100° C. and bonded to the appliance panel that is glass.

4. The appliance apparatus of claim 1, wherein the polymeric support is a hinge bracket free of a corrosion resistant coating, and the hinge bracket does not substantially degrade or corrode during bleach and moisture testing.

5. The appliance apparatus of claim 1, wherein the appliance panel is a top loading glass lid pivotally mounted to a clothing washing machine appliance, further comprising a second polymeric support with elongated dimensions of the polymeric supports being substantially coaxially aligned with each other.

6. The appliance apparatus of claim 1, wherein the polymeric support is an engineering grade polymer that is corrosion resistant and free of a coating.

7. The appliance apparatus of claim 1, wherein the polymeric support is a latch striker to assist in preventing opening of the appliance panel.

8. The appliance apparatus of claim 1, wherein the polymeric support has a spanning bottom wall integrally formed with and extending between the main walls.

9. The appliance apparatus of claim 8, wherein the generally U-shaped cross-sectional configuration of the polymeric support defines a trough between the main walls and adjacent the spanning bottom wall that is co-extensive with the main walls and that receives a hinge.

10. The appliance apparatus of claim 8, wherein the spaced apart tapered ribs include two outermost ribs disposed at opposing ends of the polymeric member, the two outermost ribs extending across and projecting from the bottom wall to form an overhanging peripheral reinforcement structure.

11. The appliance apparatus of claim 8, wherein the spaced apart tapered ribs include two outermost ribs disposed at opposing ends of the polymeric member and the main walls and the spanning bottom wall extend axially beyond one of the two outermost ribs and beyond the pair of flanges to form a protruding portion of the polymeric member.

12. The appliance apparatus of claim 11, wherein the protruding portion of the polymeric member includes at least one hole extending through the main walls that receives a fastener to secure the polymeric member to a hinge.

13. The appliance apparatus of claim 1, wherein the at least one raised pad is multiple raised pads and each flange of the pair of flanges includes at least one of the multiple raised pads extending therefrom.

14. An appliance apparatus comprising:
a moveable glass appliance door;
polyurethane adhesive pellets which are heat activatable above 100° C.;
a polymeric hinge bracket directly bonding to the glass door by the adhesive pellets;
the polymeric hinge bracket comprising a pair of flanges extending along a surface that is substantially parallel to an adjacent backside surface of the appliance door, the polyurethane adhesive pellets being disposed between the pair of flanges and the adjacent backside surface of the appliance door; and
the polymeric hinge bracket further comprising main walls extending from each flange of the pair of flanges at an angle that are spaced apart from one another and that are connected by a spanning bottom wall, the main walls and the spanning bottom wall of the polymeric hinge defining a recessed space with at least one open end that receives a hinge member.

15. The appliance apparatus of claim 14, wherein opening of the appliance door allows access to a rotatable clothing basket.

16. The appliance apparatus of claim 14, wherein the polymeric hinge bracket comprises spaced apart tapered ribs spanning between the pair of flanges and the main walls, the flange, main walls, spanning bottom wall, and spaced apart tapered ribs all being integrally created.

17. The appliance apparatus of claim 14, wherein the adhesive pellets bond at least a flange of the polymeric hinge bracket exclusively to a backside surface of the appliance door.

18. The appliance apparatus of claim 14, wherein the polymeric hinge bracket is a glass filled engineering grade polymer and the adhesive pellets stick to the polymeric hinge bracket prior to heat activation of the pellets, and the pellets each have a substantially circular-cylindrical shape bordered by substantially flat ends.

19. A clothing appliance comprising:
a rotating clothing basket;
a glass door including a transparent middle section and a substantially non-transparent peripheral section having frit on a backside thereof;
a hinge allowing the door to open and close relative to the basket adjacent the backside of the door; and
a polymeric hinge bracket coupling the hinge to the door, the bracket including an integrally molded flange, an offset wall defining a trough with open ends that receives the hinge, the offset wall extending axially beyond flange where the offset wall defines at least one hole that receives a fastener securing the polymeric hinge bracket to the hinge.

20. The appliance of claim 19, wherein the clothing appliance is a top loading washing machine and the hinge allows the glass door to pivot about a substantially horizontal axis.

21. The appliance of claim 19, wherein the clothing appliance is a washing machine, and the hinge allows the door to pivot about an axis.

22. The apparatus of claim 19, wherein the clothing appliance is a clothes dryer.

\* \* \* \* \*

UNITED STATES PATENT AND TRADEMARK OFFICE
CERTIFICATE OF CORRECTION

PATENT NO. : 9,049,929 B2  
APPLICATION NO. : 13/754962  
DATED : June 9, 2015  
INVENTOR(S) : Kilgore et al.

Page 1 of 1

It is certified that error appears in the above-identified patent and that said Letters Patent is hereby corrected as shown below:

Title Page, Item (72) Inventors:

should read

-- (72) Inventors: Dorian J. Kilgore, Commerce Township, MI (US); William Teller, Lake Orion, MI (US); Jeffrey Moser, White Lake, MI (US); Manuel Martinez, Utica, MI (US) --

Signed and Sealed this

Thirteenth Day of October, 2015

Michelle K. Lee
*Director of the United States Patent and Trademark Office*